US010263276B2

(12) United States Patent
Kobayashi

(10) Patent No.: US 10,263,276 B2
(45) Date of Patent: Apr. 16, 2019

(54) PRODUCING METHOD OF ASSEMBLED BATTERY

(71) Applicant: TOYOTA JIDOSHA KABUSHIKI KAISHA, Toyota-shi, Aichi-ken (JP)

(72) Inventor: Keiichiro Kobayashi, Nissin (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 15/158,856

(22) Filed: May 19, 2016

(65) Prior Publication Data

US 2016/0351941 A1 Dec. 1, 2016

(30) Foreign Application Priority Data

May 29, 2015 (JP) ................. 2015-110150

(51) Int. Cl.
| | |
|---|---|
| *H01M 10/42* | (2006.01) |
| *H01M 10/04* | (2006.01) |
| *H01M 2/10* | (2006.01) |
| *H01M 2/20* | (2006.01) |
| *H01M 2/30* | (2006.01) |
| *H01M 10/0587* | (2010.01) |

(52) U.S. Cl.
CPC ..... *H01M 10/0481* (2013.01); *H01M 2/1077* (2013.01); *H01M 2/206* (2013.01); *H01M 2/305* (2013.01); *H01M 10/0431* (2013.01); *H01M 10/0587* (2013.01); *H01M 2220/20* (2013.01)

(58) Field of Classification Search
CPC ......... H01M 10/0481; H01M 10/0431; H01M 2/305; H01M 2/206; H01M 2/1077; H01M 10/0587
See application file for complete search history.

(56) References Cited

U.S. PATENT DOCUMENTS

| | | | |
|---|---|---|---|
| 2001/0012588 A1* | 8/2001 | Kaido ................... | H01M 4/04 429/233 |
| 2010/0190049 A1 | 7/2010 | Kawase et al. | |

FOREIGN PATENT DOCUMENTS

| | | |
|---|---|---|
| CN | 101765932 A | 6/2010 |
| JP | 2002-373633 A | 12/2002 |
| JP | 2009-26703 A | 2/2009 |
| JP | 2014-137889 A | 7/2014 |
| KR | 10-2010-0036373 A | 4/2010 |

* cited by examiner

*Primary Examiner* — Helen Oi K Conley
(74) *Attorney, Agent, or Firm* — Sughrue Mion, PLLC

(57) ABSTRACT

A producing method of an assembled battery includes: preparing plural battery cells each of which includes an electrode body having a positive electrode and a negative electrode, and a container for housing the electrode body; classifying the plural battery cells into plural thickness ranks depending on a thickness in an arrangement direction of the electrode body housed inside each battery cell; and arranging the plural battery cells in the arrangement direction, and fastening the plural battery cells such that a load is applied to the plural battery cells in the arrangement direction, the plural battery cells being selected from the plural thickness ranks in a manner as to conform a length in the arrangement direction of the battery cells is adapted to a predetermined length when the plural battery cells are arranged in the arrangement direction.

6 Claims, 4 Drawing Sheets

PRODUCING METHOD OF ASSEMBLED BATTERY

INCORPORATION BY REFERENCE

The disclosure of Japanese Patent Application No. 2015-110150 filed on May 29, 2015 including the specification, drawings and abstract is incorporated herein by reference in its entirety.

BACKGROUND OF THE INVENTION

1. Field of the Invention

The present invention relates to a producing method of an assembled battery including a plurality of re-chargeable battery cells (secondary batteries) arranged in a predetermined direction, and fastened with a load applied to the battery cells in the arrangement direction.

2. Description of Related Art

A lightweight high-energy density lithium-ion secondary battery, nickel-hydrogen battery or another secondary battery, or an electricity storage element such as a capacitor is used as a battery cell, and an assembled battery formed by connecting plural battery cells in series is used as an electric power supply affording high output, and used as an electric power source for installation in a vehicle, or a power source for a personal computer and a portable terminal. For instance, as an example of an assembled battery for installation in a vehicle, Japanese Patent Application Publication No. 2014-137889 discloses an assembled battery configured by arranging plural battery cells in the same shape constituted by lithium-ion secondary batteries, and connecting respective positive electrode terminals and respective negative electrode terminals of the battery cells in series.

Meanwhile, in an assembled battery mounted in a vehicle such as an automobile, it is supposed that a mounting space for the assembled battery is limited, and the assembled battery is used under vibrational circumstances; thus the assembled battery is assembled by arranging a number of battery cells in a fastened state (i.e., a state in which battery cells are mutually fixed) as described in JP 2014-137889 A, for example. In such a fastened state, a considerable load is applied to the individual battery cells assembled into the assembled battery.

In production of an assembled battery, if plural battery cells are arranged and fastened with a load applied to the battery cells in the arrangement direction thereof, the load causes distortion and deformation in the loading direction to a container (i.e., an outer case body for housing an electrode body thereinside) of every battery cell. Hence, a thickness in an arrangement direction of each battery cell in a state in which the battery cells are fastened with a load applied to the battery cells in a predetermined arrangement direction depends on a thickness of an electrode body inside the container of each battery cell. However, there is usually variation (irregularity) in thickness among the electrode bodies to some extent. If a number of battery cells including electrode bodies having aforementioned variation in thickness are arranged and fastened in a stacking direction, variation in thickness in the arrangement direction occurs among the respective battery cells in the fastened state, and the variation in thickness among the battery cells is accumulated. As a result, produced assembled batteries experience variation in length in the arrangement direction. Such variation in length in the arrangement direction (external dimension) among the assembled batteries causes the following inconveniences: the assembled battery cannot be mounted in a previously prepared mounting space, or a redundant gap remains when the assembled battery is mounted in this mounting space. In addition, there may be caused a disadvantage in designing that requires securing of a greater allowance for a guaranteed performance of an external dimension of the assembled battery in order to accept variation in external dimension thereof (i.e., providing a redundant space around the assembled battery). Hence, in production of an assembled battery, it is preferable to reduce variation in length in the arrangement direction of the assembled battery.

SUMMARY OF THE INVENTION

The present invention provides a producing method of an assembled battery capable of reducing variation in length in the arrangement direction of an assembled battery resulting from irregularity in shape among electrode bodies housed inside respective battery cells assembled into the assembled battery, thereby producing the assembled battery having a dimension (particularly, a length dimension of the assembled battery in the arrangement direction of the battery cells assembled into the assembled battery) previously set.

One aspect of the present invention is a producing method of an assembled battery including: preparing plural battery cells each of which includes an electrode body having a positive electrode and a negative electrode, and a container for housing the electrode body; classifying the plural battery cells into plural ranks depending on a thickness in an arrangement direction of the electrode body housed inside each battery cell; and arranging the plural battery cells in the arrangement direction, and fastening the plural battery cells such that a load is applied to the plural battery cells in the arrangement direction, the plural battery cells being selected from the plural ranks such that a length in the arrangement direction of the battery cells is adapted to a predetermined length when the plural battery cells are arranged in the arrangement direction, wherein the plural battery cells includes at least one battery cell selected from each of two or more ranks among the plural ranks.

In the present specification, the term "battery cells" refers to individual electricity storage elements which may be connected in series with one another in order to configure an assembled battery, and unless otherwise mentioned, encompasses batteries and capacitors with various compositions. "Secondary batteries" denotes batteries in general which can be repetitively charged and encompass so-called storage batteries including lithium-ion secondary batteries or nickel-hydrogen batteries. An electricity storage element that constitutes a lithium ion secondary battery is a typical example of a "battery cell" as used herein, and a lithium ion secondary battery module including a plurality of such battery cells is a typical example of an "assembled battery" as disclosed herein. The technique as disclosed herein is applicable to an assembled battery formed by arranging a predetermined number of battery cells (e.g., lithium ion secondary batteries) each having a flat external shape in a direction in which flat surfaces thereof are stacked (stacking direction), and connecting electrode terminals of the respective battery cells in series or in parallel.

According to the above aspect, the predetermined number of battery cells assembled into the assembled battery are selected and combined in a manner as to offset variation in thickness among the electrode bodies inside the respective battery cells (furthermore, variation in thickness among the battery cells in a fastened state), and conform the length in the arrangement direction of the assembled battery to the specified length; therefore, it is possible to produce the assembled battery with a precise dimension (particularly, a precise length dimension of the assembled battery relative to the arrangement direction of the battery cells assembled into the assembled battery). Hence, according to the producing method of the present invention, it is possible to provide the assembled battery for installation in a vehicle and other purposes having preferable uniformity in external dimension (length in the arrangement direction), and having excellent mountability.

In the above aspect, each electrode body may be a wound electrode body in a flat shape formed by winding a positive electrode sheet including a positive electrode active substance layer on a long positive electrode current collector, and a negative electrode sheet including a negative electrode active substance layer on a long negative electrode current collector. The thickness of the wound electrode body is likely to be irregular depending on the degree and condition of its winding. Hence, the battery cells including such wound electrode bodies are likely to have ununiformity in thickness among the battery cells during the fastening, but in the producing method having the aforementioned configuration, the battery cells belonging to different thickness ranks are selected and combined in a manner as to conform the length of the assembled battery in the arrangement direction to the reference length, thereby producing the assembled battery satisfying the above specified value (specified length). As a result, according to the producing method of the present aspect, it is possible to produce the assembled battery including the plural battery cells that include the wound electrode bodies as elements thereof, and also having excellent mountability.

In the above aspect, the wound electrode body may be formed in such a manner that a positive electrode sheet base member and a negative electrode sheet base member are overlaid with each other, wound, and cut per predetermined length, the positive electrode sheet base member is formed by continuously forming the positive electrode active substance layer having a length equivalent to a length of the plural battery cells on the positive electrode current collector in a longitudinal direction, the negative electrode sheet base member is formed by continuously forming the negative electrode active substance layer having a length equivalent to a length of the plural battery cells on the negative electrode current collector in the longitudinal direction. In the above aspect, although the plural wound electrode bodies can efficiently be produced, the shapes of the produced wound electrode bodies are likely to become irregular. However, in the producing method having the above configuration, it is possible to reduce variation in length in the arrangement direction of the assembled battery resulting from the irregular shapes of the wound electrode bodies, thus producing the assembled battery having a precise dimension that is previously set. Hence, according to the producing method of the present aspect, it is possible to efficiently produce the assembled battery having preferable uniformity in external dimension and excellent mountability.

In the above aspect, the number of the battery cells may be 30 or more, or 50 or more. As the number of battery cells becomes increased, it becomes more advantageous for high capacity of the assembled battery, but it is more likely to cause variation in length in the arrangement direction of the assembled battery due to irregularity in the shape among the electrode bodies. To the contrary, according to the producing method having the aforementioned configuration, even if there is variation in thickness among the electrode bodies inside a number of battery cells, it is possible to produce the assembled battery capable of offsetting variation in thickness among the electrode bodies inside the respective battery cells so as to conform the length in the arrangement direction to the above specified value (specified length) with high accuracy. Hence, according to the producing method of the present aspect, it is possible to produce the assembled battery having a high capacity and excellent mountability.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
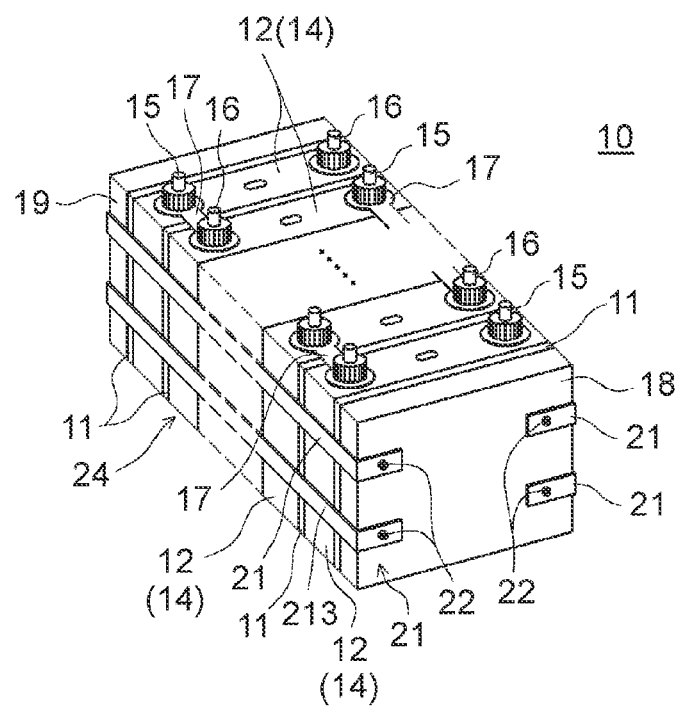
FIG. 1 is a perspective view schematically showing a configuration of an assembled battery according to one embodiment.

Hereinafter, an embodiment of the present invention will be described. Matters necessary to practice the present invention (e.g., a configuration and a producing method of positive electrodes, negative electrodes, and separators, a fastening method of battery cells, and a method of mounting the assembled battery in a vehicle) other than matters specifically referred to in the present specification (e.g., a structure of a battery cell as an element of an assembled battery) may be understood as design matters based on the related art in the pertinent field to a person of ordinary skills in the art. The embodiment of the present invention can be practiced based on the contents disclosed in the present specification and common technical knowledge in the subject field. The assembled battery according to the embodiment of the present invention may be used as an electric power supply for a motor (electric motor) mounted in a vehicle such as an automobile. Hence, the embodiment of the present invention provides a vehicle (an automobile including an electric motor, such as a hybrid vehicle, an electric vehicle, and a fuel cell vehicle) including the aforementioned assembled battery as an electric power supply.

The assembled battery produced by applying a technique as disclosed herein is not limited to a particular configuration of each battery cell as far as the assembled battery is formed by arranging battery cells (typically, battery cells in a flat external shape) and fastening the battery cells in the arrangement direction (stacking direction). An example of the battery cell may include a secondary battery such as a nickel-hydrogen battery and an electric double layer capacitor. The present invention may preferably be employed as a producing method of an assembled battery in which lithium ion secondary batteries are used as battery cells. Because a lithium ion secondary battery is a secondary battery affording high output with a high energy density, lithium ion secondary batteries can be assembled into an assembled battery with high performance, particularly into an assembled battery (battery module) for installation in a vehicle. The embodiment of the present invention may be a producing method of an assembled battery in which a plurality of such arranged battery cells are connected in series or in parallel.

Although not intended to be limiting, the embodiment of the present invention will be described in details by using an example that uses a lithium ion secondary battery in a flat shape as a battery cell, and produces an assembled battery by connecting the multiple battery cells in series, hereinafter. In the following drawings, the same reference numerals may be used for members or portions having the same functions, and descriptions thereof may not be repeated or may be simplified.

The battery cell used as an element of the assembled battery produced according to the embodiment described below may be similar to a battery cell that is assembled into a conventional assembled battery, and typically includes an electrode body having predetermined battery forming materials (respective active substances for positive and negative electrodes, respective current collectors of the positive and negative electrodes, separators, and others), and a container that houses the electrode body and an appropriate electrolyte therein.

Figure 2:
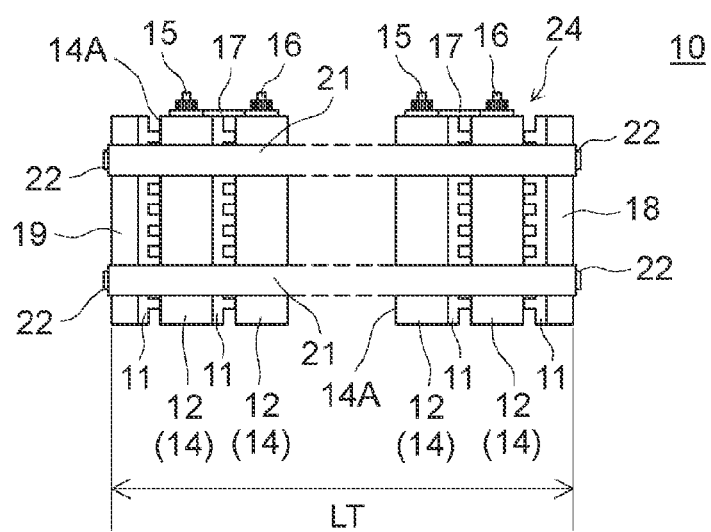
FIG. 2 is a side view schematically showing the configuration of the assembled battery according to one embodiment.

As shown in FIG. 1 and FIG. 2, the assembled battery 10 as disclosed herein includes, as an example, a plurality of (typically 10 or more (for example, 10 to 100), preferably 30 or more, and more preferably 50 or more, and even more preferably 60 or more) battery cells 12. Each battery cell 12 includes a container 14 in a shape (box shape in the present embodiment) that can house a wound electrode body in a flat shape described later therein.

The container 14 is provided with a positive electrode terminal 15 electrically connected to a positive electrode of the wound electrode body and a negative electrode terminal 16 electrically connected to a negative electrode of the wound electrode body. As shown in the drawings, between each two adjacent battery cells 12, the positive electrode terminal 15 of one battery cell 12 and the negative electrode terminal 16 of the other battery cell 12 are electrically connected by a connecting tool 17. In this manner, the respective battery cells 12 are connected in series, thereby assembling the assembled battery 10 having a desired voltage. Each of these containers 14 may be provided with a safety valve or the like for discharging gas generated inside the container as similar to a conventional container of a battery cell. The configuration of this container 14 does not characterize the present invention; therefore, detailed description thereof will be omitted.

The material of the container 14 is not limited to a particular one, and the material may be the same as that used in a conventional battery cell. In light of suitability for installation in a vehicle or the like, an example of a preferable material for carrying out the present invention may include a relatively lightweight material. For example, there may be preferably used a container made of metal (e.g., aluminum, and steel), a container made of a synthetic resin (e.g., a polyolefinic resin, such as polyethylene and polypropylene, or a high-melting point resin, such as a polyethylene-telephthalate, polytetrafluoroethylene, and polyamide resin). The container may be a resin film container conventionally used as an outer case body of a battery, such as a laminated film container in a three-layer structure including: an outer surface (protective) layer made of a high-melting point resin (e.g., a high-melting point resin, such as a polyethylene-telephthalate, polytetrafluoroethylene, and a polyamide resin); a barrier layer (i.e., layer capable of blocking gas and water) configured by a metallic foil (e.g., aluminum, and steel); and an adhesive layer configured by a thermal adhesive resin (a resin having a relatively low-melting point, for instance, a polyolefinic resin, such as ethylene-vinyl acetate, polyethylene, and polypropylene). The container 14 according to the present embodiment is made of aluminum, for example.

As shown in FIG. 1 and FIG. 2, while the plural battery cells 12 are so arranged as to be reversed to each adjacent battery cell 12 one by one so that the respective positive electrode terminals 15 and the respective negative electrode terminals 16 are alternately arranged with constant intervals, the battery cells 12 are arranged in a direction in which surfaces 14A having wider widths (i.e., corresponding to flat surfaces of the wound electrode bodies 30 (described later) housed in the respective containers 14) of the respective containers 14 face one another. Furthermore, a cooling plate 11 in a predetermined shape is disposed between every two adjacent battery cells 12 and to both outer sides of the battery cells 12 in the battery cell arrangement direction with each cooling plate 11 in tight contact with the wide surface 14A of each adjacent container 14. This cooling plate 11 functions as a radiating member for efficiently dissipating heat generated in each battery cell in operation, and has a frame shape (comb-like shape having projections and recesses in a side view, as shown in the drawing, for example) so as to introduce a cooling fluid (typically air) between every two adjacent battery cells 12. The cooling plate 11 is preferably made of metal excellent in thermal conductivity, or a lightweight and hard synthetic resin, such as polypropylene and others.

There is provided a pair of end plates 18, 19 outward of the both outer sides of the battery cells 12 and the cooling plates 11 that are arranged in the above manner. The aforementioned battery cell group and the end plates 18, 19 are all fastened together by plural fastening bands 21 that are so provided as to extend across (couple) the both end plates 18, 19 while a load is applied in the stacking direction (arrangement direction) of the above fastened body 24.

All the battery cell group, the cooling plates 11, and the end plates 18, 19 that are arranged in the stacking direction of the battery cells 12 in this manner (also referred to as a "fastened body", hereinafter) are fastened in the stacking direction of the fastened body at a specified fastening pressure P by the fastening bands 21 so fixed as to extend across the both end plates 18, 19. More specifically, as shown in FIG. 2, an end of each fastening band 21 is fastened and fixed to the end plate 18 with a screw 22, thereby applying the specified fastening pressure P (a surface pressure received by a wall surface of the container 14 is approximately $2\times10^6$ to $5\times10^6$ Pa, for example) is applied to the fastened body 24 in the arrangement direction thereof. A length in the arrangement direction of the assembled battery 10 fastened with the above specified fastening pressure P (length between the respective outer ends of the end plates 18 and 19 in an example as shown in FIG. 1 and FIG. 2) is defined as a specified length LT. In the present specification, the "specified length LT" denotes a length of the assembled battery extending along the arrangement direction of the predetermined number of battery cells assembled into the assembled battery, and may typically be understood as an acceptable length range including allowance. For example, it may be understood that if the specified length LT is referred to be X cm, the specified length LT falls within a range of X±α including the allowance ±α.

In the producing method according to the present example, the assembled battery 10 having the aforementioned configuration is efficiently produced in a manner as to stably realize the specified length LT. Hereinafter, this producing method will be described with reference to the schematic drawings as shown in FIG. 3 to FIG. 6. A process of preparing the plural battery cells 12 to be assembled into the assembled battery 10 will be described. Each of these battery cells 12 includes an electrode body 30 having a positive electrode and a negative electrode. In the present embodiment, the electrode body 30 is a wound electrode body 30 in a flat shape formed by winding a positive electrode sheet 32 including a positive electrode active substance layer on a long positive electrode current collector, a negative electrode sheet 34 including a negative electrode active substance layer on a long negative electrode current collector, and separators 36.

A material and a member configuring the wound electrode body 30 may be the same as those of an electrode body of a conventional lithium ion battery, and are not limited to particular ones. For instance, the positive electrode sheet 32 may be formed by providing the positive electrode active substance layer for a lithium ion battery on the long positive electrode current collector. An aluminum foil (in the present embodiment) or any other metallic foils suitable for the positive electrode is preferably used for the positive electrode current collector. As the positive electrode active substance, one or two or more substances conventionally used in a lithium ion secondary battery can be used without any particular limitation. A preferable example thereof may include a lithium transition metal oxide, such as $LiMn_2O_4$, $LiCoO_2$, and $LiNiO_2$. For instance, an aluminum foil having a length of approximately 2 m to 4 m (e.g., 2.7 m), a width of approximately 8 cm to 12 cm (e.g., 10 cm), and a thickness of approximately 5 μm to 20 μm (e.g., 15 μm) is used as the current collector, and the positive electrode active substance layer is formed in a predetermined region of a surface of this foil, thereby forming the preferable positive electrode sheet 32.

Meanwhile, the negative electrode sheet 34 may be formed by providing the negative electrode active substance layer for a lithium ion battery on the long negative electrode current collector. A copper foil (in the present embodiment) or any other metallic foils suitable for the negative electrode is preferably used for the negative electrode current collector. As the negative electrode active substance, one or two or more substances conventionally used in a lithium ion secondary battery can be used without any particular limitation. A preferable example thereof may include a carbon-based material, such as a graphitic carbon and amorphous carbon, a lithium transition metal oxide, or a transition metal nitride. For instance, a copper foil having a length of approximately 2 m to 4 m (e.g., 2.9 m), a width of approximately 8 cm to 12 cm (e.g., 10 cm), and a thickness of approximately 5 μm to 20 μm (e.g., 10 μm) is used, and the negative electrode active substance layer is formed in a predetermined region of a surface of this foil, thereby forming the preferable negative electrode sheet 34.

A preferable example of the separator sheet 36 used between the positive electrode sheet 32 and the negative electrode sheet 34 may include a sheet made of a porous polyolefin resin. For example, a porous separator sheet made of a synthetic resin (e.g., made of polyolefin, such as polyethylene) having a length of approximately 2 m to 4 m (e.g., 3.1 m), a width of approximately 8 cm to 12 cm (e.g., 11 cm), and a thickness of approximately 5 μm to 30 μm (e.g., 25 μm) may preferably be used.

In the formation of the wound electrode body 30, in the same manner as that of a wound electrode body of a common lithium ion secondary battery, the positive electrode sheet 32, the first separator 36, the negative electrode sheet 34, and the second separator 36 are laminated in this order, and these are wound while the positive electrode sheet 32 and the negative electrode sheet 34 are slightly shifted relative to each other in the lateral direction. The produced wound body is pressed to be crushed from the side surface direction, thereby producing the wound electrode body 30 in a flat shape.

Figure 5:
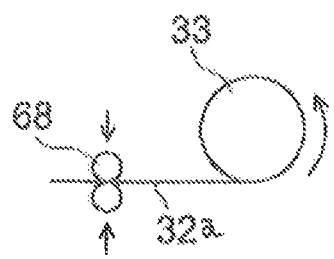
FIG. 5 is an explanatory drawing schematically showing a producing method of the wound electrode body according to one embodiment.

In a preferable one aspect, in the production of the wound electrode body 30, the positive electrode active substance layer is formed on the long positive electrode current collector, thereby producing the positive electrode sheet. For instance, as shown in FIG. 5, a composition formed by dispersing a material used for forming the positive electrode active substance mainly containing the positive electrode active substance in an appropriate dispersion medium is applied to one longitudinal end (application start point) to the other longitudinal end (application end point) of the positive electrode current collector, and is then dried, and this is held and pressed between rollers 68, thereby producing a positive electrode sheet base member 32a including the positive electrode active substance layer, having a length equivalent to a length of plural (e.g., 100 to 500) battery cells 12, continuously formed on the positive electrode current collector in the longitudinal direction. Similarly, a composition formed by dispersing a material used for forming the negative electrode active substance mainly containing the negative electrode active substance in an appropriate dispersion medium is applied to one longitudinal end (application start point) to the other longitudinal end (application end point) of the negative electrode current collector, and is then dried, and this is held and pressed between the rollers, thereby producing a negative electrode sheet base member 34a including the negative electrode active substance layer, having a length equivalent to a length of plural (e.g., 100 to 500) battery cells 12, continuously formed on the long negative electrode current collector in the longitudinal direction.

Figure 6:
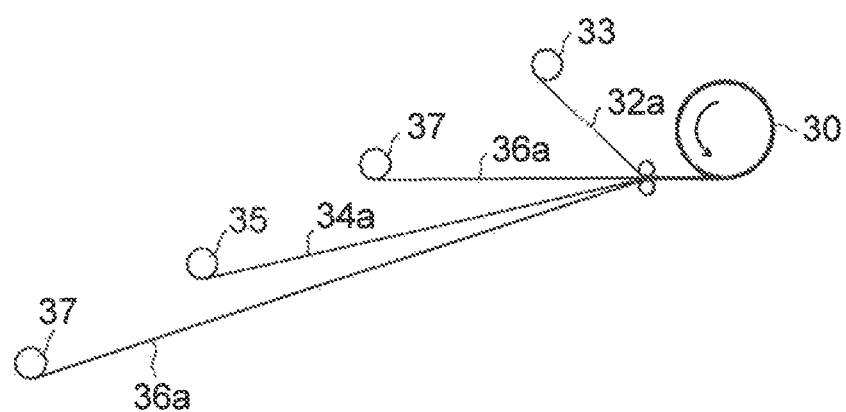
FIG. 6 is an explanatory drawing schematically showing the producing method of the wound electrode body according to one embodiment.

As shown in FIG. 6, a positive electrode roll 33 formed by winding the positive electrode sheet base member 32a into a roll shape, a negative electrode roll 35 formed by winding the negative electrode sheet base member 34a into a roll shape, and each separator roll (formed by winding a separator sheet base member 36a having a length equivalent to that of the plural battery cells 12 into a roll shape) 37 are set in a winding apparatus; and the positive electrode sheet base member 32a, the negative electrode sheet base member 34a, and the two separator sheet base members 36a are pulled out from the respective rolls 33, 35, 37. The positive electrode sheet base member 32a, the first separator sheet base member 36a, the negative electrode sheet base member 34a, and the second separator sheet base member 36a are respectively laminated in this order and wound by predetermined amount, and are cut at a terminal end position so as to obtain a predetermined length (length by a single battery cell) when the winding is ended. Each wound end portion of these members cut at the terminal end position is wound up, thereby producing the wound electrode body 30. This process is repetitively carried out so as to continuously form the plural wound electrode bodies 30 (e.g., 100 to 500 bodies) from the respective single rolls 33, 35, 37.

Figure 3:
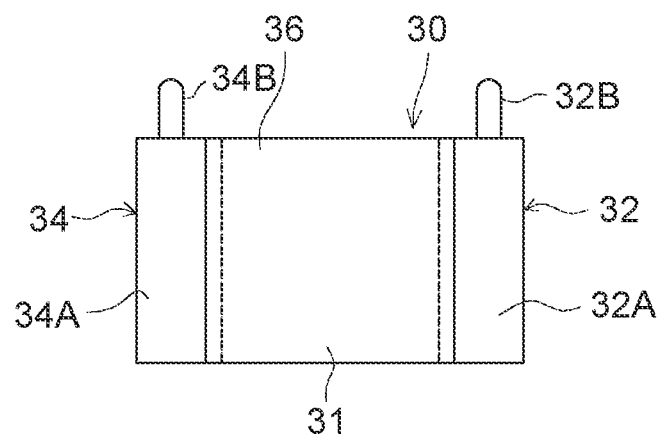
FIG. 3 is a front view schematically showing a wound electrode body according to one embodiment.
Figure 4:
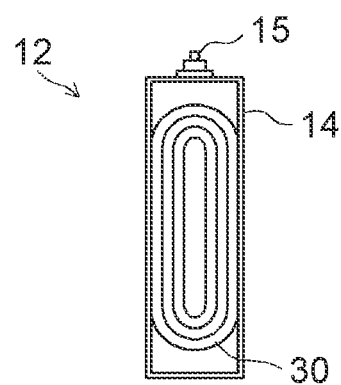
FIG. 4 is a drawing schematically showing an inside state of a container of a battery cell according to one embodiment.

In each produced wound electrode body 30 in a flat shape, as shown in FIG. 3, as a result from winding-up of the wound electrode body 30 while shifting the wound electrode body 30 in the lateral direction relative to the winding direction of the wound electrode body 30, respective end parts of the positive electrode sheet 32 and the negative electrode sheet 34 protrude outward from a wound core portion 31 (i.e., a portion in which a portion of the positive electrode sheet 32 where the positive electrode active substance layer is formed, a portion of the negative electrode sheet 34 where the negative electrode active substance layer is formed, and the separator sheets 36 are tightly wound up). The protruding portion of the positive electrode (i.e., a portion where the positive electrode active substance layer is not formed) 32A and the protruding portion of the negative electrode (i.e., a portion where the negative electrode active substance layer is not formed) 34A are respectively provided with a positive electrode lead terminal 32B and a negative electrode lead terminal 34B, and the respective lead terminals 32B and 34B are electrically connected to the aforementioned positive electrode terminal 15 and negative electrode terminal 16. As shown in FIG. 4, the wound electrode body 30 is housed in the container 14 with a winding axis of the wound electrode body 30 laid down sideways, and a nonaqueous electrolyte (electrolytic solution), such as a mixed solvent of diethyl carbonate and ethylene carbonate (e.g., mass ratio of 1:1), containing appropriate amount (e.g., concentration of 1 M) of a supporting electrolyte (e.g., lithium salt, such as $LiPF_6$) is injected and sealed into the container 14, thereby forming the battery cell 12. Subsequently, each battery cell 12 is charged and discharged once or repetitively several times so as to activate the battery cell after being assembled, thereby putting the battery cell into a practically usable state.

Figure 7:
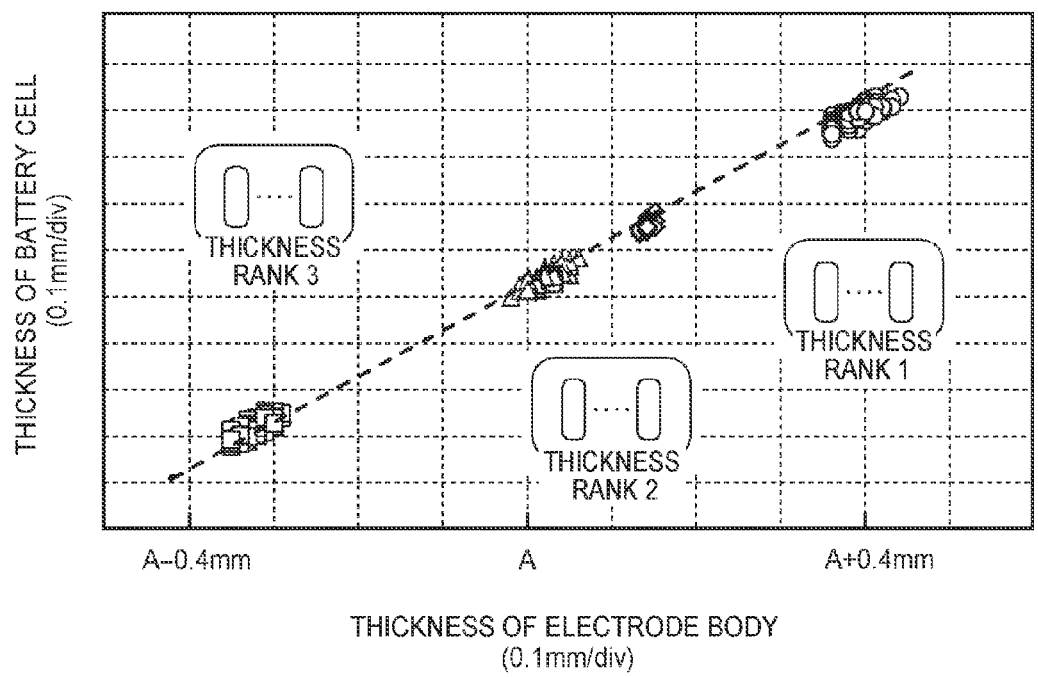
FIG. 7 is a graph showing a relation between a thickness of the electrode body and a thickness of the battery cell in a fastened state.

Based on findings obtained by the present inventors, as aforementioned, in the production of the assembled battery 10, if the plural battery cells 12 are arranged and fastened in the arrangement direction thereof, each container 14 is flexible, and thus distortion or deformation in the loading direction is caused to the container 14. Consequently, in a state in which the load is applied to each battery cell 12 in the predetermined arrangement direction while the battery cell 12 is fastened, the thickness in the arrangement direction of each battery cell 12 more greatly depends on the thickness of the electrode body 30 inside the container 14 than the external shape of the container 14 out of the fastened state. However, in general, there is variation (irregularity) in thickness among the electrode bodies 30 to some extent due to condition change during the production, or the like. If the plural battery cells 12 including the electrode bodies 30 having such variation in thickness are arranged and fastened in the stacking direction, as shown in FIG. 7, variation in thickness in the arrangement direction of the battery cells 12 is caused among the respective battery cells 12 due to the variation in thickness among the respective electrode bodies 30, and the variation in thickness among these battery cells 12 is accumulated, which results in variation in length in the arrangement direction of the produced assembled battery 10. FIG. 7 is a graph showing a relation between a thickness of the electrode body and a thickness (in the fastened state) of the battery cell including the above electrode body.

In the producing method as disclosed herein, in order to converge the variation in length in the arrangement direction of the assembled battery 10 resulting from the irregularity in the shape among the electrode bodies 30 as aforementioned, the plural battery cells 12 are combined in a manner as to offset the variation in thickness among the electrode bodies 30 inside the respective battery cells 12, thereby assembling the assembled battery 10.

Specifically, the aforementioned process of preparing the plural battery cells 12 includes measurement of the thickness T in the arrangement direction of the electrode body 30 housed in each battery cell 12. The plural battery cells 12 are classified into plural thickness ranks having respective different thickness ranges depending on the thickness (measurement value) T in the arrangement direction of each electrode body 30 (classifying process). For example, based on the graph of FIG. 7, the electrode body 30 having a thickness T in the arrangement direction of the electrode body 30 falling within a range of the target electrode body thickness of A±0.2 mm (i.e., A−0.2 mm≤T≤A+0.2 mm) is classified into a thickness rank 2 having a representative value of "A"; the electrode body 30 having a thickness T in the arrangement direction of the electrode body 30 falling within a range of A+0.2 mm<T≤A+0.6 mm is classified into a thickness rank 1 having a representative value of "A+0.4 mm"; and the electrode body 30 having a thickness T in the arrangement direction of the electrode body 30 falling within a range of A−0.6 mm≤T<A−0.2 mm is classified into a thickness rank 3 having a representative value of "A−0.4 mm". The predetermined number of the battery cells 12 to be assembled into the assembled battery 10 are selected and combined from two or more ranks of the above thickness ranks 1 to 3 so as to conform the length in the arrangement direction of the assembled battery 10 to a specified length LT previously set.

According to one preferable aspect, the predetermined number of the battery cells 12 to be assembled into the assembled battery 10 are selected and combined from the above thickness ranks 1 to 3 so that a total value of the representative values of the thickness ranks to which the respective selected battery cells belong becomes a specified electrode body length RT. Specifically, if X battery cells belonging to the rank 1, Y battery cells belonging to the rank 2, and Z battery cells belonging to the rank 3 are selected and combined, this selective combination may be made in such a manner that the total value of "A+0.4 mm"×X+A×Y+"A−0.4 mm"×Z conforms to the specified electrode body length RT. The aforementioned specified electrode body length RT is typically calculated based on "the target electrode body thickness A×the predetermined number", and it is defined that the fastened body 24 having the total thickness of the specified electrode body length RT and the other components included in the assembled battery is fastened with the specified fastening pressure P, thereby configuring the assembled battery having the specified length LT in the arrangement direction.

The fastened body is assembled by alternately arranging the predetermined number of the battery cells 12 selected in the above manner and the cooling plates 11, and furthermore, disposing the end plates 18, 19 at the both ends thereof. As shown in FIG. 2, the end of each fastening band 21 is fastened and fixed to the end plates 18, 19 with the screws 22 so as to fasten the fastened body 24 with the specified fastening pressure P applied to the fastened body 24 in the arrangement direction thereof, thereby assembling the assembled battery 10 (assembling process of the assembled battery).

According to the producing method of the present embodiment, regardless of the variation in thickness among the electrode bodies 30 inside the respective battery cells 12, the predetermined number of the battery cells 12 to be assembled are selected and combined from two or more ranks of the rank 1 to the rank 3 so as to offset the variation in thickness among the electrode bodies 30 inside the respective battery cells 12 (furthermore, variation in thickness among the respective battery cells in the fastened state), and conform the length in the arrangement direction of the assembled battery 10 to the specified length LT. Through this configuration, it is possible to produce the assembled battery 10 capable of offsetting the variation in thickness among the individual electrode bodies so that the length in the arrangement direction satisfies the specified length LT. Accordingly, it is possible to avoid the following inconvenience: variation in length in the arrangement direction of the assembled battery occurs due to irregularity in the shape among the electrode bodies inside the respective battery cells, and thus the assembled battery cannot be housed in a previously prepared mounting space, or a redundant gap remains when the assembled battery is housed in this mounting space, as is the case with the conventional assembled battery. It is unnecessary to have a greater allowance for the external dimension guaranteed performance of each assembled battery in order to accept the irregularity in the external dimension among the assembled batteries (i.e., secure a redundant space around the assembled battery); therefore, it is possible to design the assembled battery 10 having a smaller mounting space than that in the conventional case. For example, compared with a method of using only the battery cells 12 belonging to the thickness rank 2, and excluding the battery cells 12 belonging to the thickness rank 1 (greater thickness) and belonging to the thickness rank 3 (smaller thickness), in the producing method according to the present embodiment, it is possible to promote reduction in percent defective of the battery cells 12 as well as reduction in production cost of the assembled battery 10.

An example of a preferable application target of the technique as disclosed herein may include an assembled battery including the wound electrode bodies 30 each of which is formed by using the positive electrode sheet base member 32*a* and the negative electrode sheet base member 34*a* as aforementioned. This wound electrode body 30 can be efficiently produced, but the shape thereof is likely to be irregular at the same time. More specifically, in the positive electrode sheet base member 32*a* (FIG. 5) formed such that the positive electrode active substance layer having a length equivalent to a length of the plural battery cells is continuously formed on the positive electrode current corrector, the thickness of the positive electrode active substance layer tends to be gradually smaller from one longitudinal end (application start point) toward the other longitudinal end (application end point) of the positive electrode current corrector. Similarly, in the negative electrode sheet base member 34*a* formed such that the negative electrode active substance layer having a length equivalent to a length of the plural battery cells 12 is continuously formed on the negative electrode current corrector, the thickness of the negative electrode active substance layer tends to be gradually smaller from one longitudinal end (application start point) toward the other longitudinal end (application end point) of the negative electrode current corrector. Hence, as shown in FIG. 6, if the plural wound electrode bodies 30 are continuously formed by using the positive electrode sheet base member 32*a* and the negative electrode sheet base member 34*a*, both the positive electrode sheet base member 32*a* and the negative electrode sheet base member 34*a* have the same tendency of variation in thickness; therefore, both portions having greater (smaller) thicknesses of the both sheets are likely to be combined to each other, and thus the difference in thickness among the wound electrode bodies 30 is likely to become greater. In addition, at an earlier stage of the winding, the wound electrode body 30 having a relatively greater thickness tends to be hardened, and at a later stage of the winding, the wound electrode body 30 having a relatively smaller thickness tends to be hardened. If the assembled battery is assembled by combining the battery cells including the wound electrode bodies 30 having relatively greater thicknesses (or the wound electrode bodies 30 having relatively smaller thicknesses) that have been hardened in the above formation order, the variation in length in the arrangement direction of the assembled battery is likely to become greater. To the contrary, according to the present aspect, it is possible to suppress the variation in length in the arrangement direction of the assembled battery resulting from the irregularity in the shape among the wound electrode bodies, thus producing the assembled battery having a precise dimension as previously set. Therefore, according to the producing method of the present aspect, it is possible to efficiently produce the assembled battery having preferable uniformity in external dimension and excellent mountability.

In the aforementioned embodiment, it is exemplified that the plural battery cells 12 are classified into the three thickness ranks 1 to 3 depending on the thickness of each electrode body 30, but the number of the thickness ranks for the classification is not limited to this. For example, the number of the thickness ranks may be two or more, three or more, or five or more. The upper limit of the number of the thickness ranks is not limited to particular one as far as the aforementioned effect can be attained, and may be set to be ten or less, for instance.

In the aforementioned embodiment, the individual thicknesses in the arrangement direction of the electrode bodies 30 are measured, and the electrode bodies are classified into the plural thickness ranks based on the measurement values, but the criterion for the classification is not limited to actual measurement values. For example, respective sheet thicknesses of the positive electrode sheet 32 and the negative electrode sheet 34 used for producing the electrode bodies 30 are measured, and the thickness of the electrode body 30 of interest is estimated based on the above sheet thicknesses. Since the thickness of the electrode body 30 depends on the respective thicknesses of the positive electrode sheet 32 and the negative electrode sheet 34, the thickness of the electrode body 30 may be estimated based on the respective sheet thicknesses, and the electrode body 30 may be classified into the plural thickness ranks based on the estimated values. However, as aforementioned in the above-described embodiment, it is possible to precisely carry out the above classification, and more accurately produce the assembled battery 10 conforming to the specified length LT in the arrangement direction if the electrode bodies 30 are classified into the plural thickness ranks based on the actual measurement values of the electrode bodies 30.

In the aforementioned embodiment, in the process of preparing the plural battery cells 12, it is exemplified that every thickness (the whole number of thicknesses) of the individual electrode bodies 30 is measured, but the number of the electrode bodies 30 of which thicknesses are measured is not limited to this. For instance, the thicknesses of the individual electrode bodies 30 may be grasped through extraction sampling per lot. For example, if the plural wound electrode bodies 30 are continuously formed by using the single positive electrode sheet base member 32*a* and the single negative electrode sheet base member 34*a* as aforementioned, the distribution of the thickness among the wound electrode bodies 30 does not become irregular (random), so that the wound electrode bodies 30 having a relatively greater thickness tend to be hardened at an earlier stage of the winding, and the wound electrode bodies 30 having a relatively smaller thickness tend to be hardened at a later stage of the winding. Accordingly, it is possible to roughly grasp the thicknesses of the individual electrode bodies 30 through the extraction sampling per lot among the plural wound electrode bodies hardened in the above formation order without measuring every thickness of the individual electrode bodies 30 in the process of preparing the plural battery cells 12, thus classifying the electrode body 30 per lot into the plural thickness ranks. The producing method of the assembled battery as disclosed herein involves this aspect.

As aforementioned, the preferable embodiment of the producing method of the assembled battery according to the present invention has been described in details, but the present invention is not intended to be limited to the above specific embodiment. For example, in the aforementioned embodiment, the electrode body 30 is housed in the container 14 with the winding axis of the wound electrode body 30 extending along the width direction of the battery cell 12 (in the direction of the drawing thickness in FIG. 2), but the electrode body 30 may be so disposed as to put the winding axis in the height direction (vertical direction in FIG. 2) of the battery cell 12. Instead of the winding-type electrode body 30, it may be configured to use an electrode body of a laminating type formed by alternately laminating plural positive electrode sheets and plural negative electrode sheets along with separator sheets. In the electrode body of the laminating type, there still exists variation (irregularity) in thickness due to condition change during the production, or the like. The present invention as disclosed herein is preferably applicable to an assembled battery formed by arranging, in the stacking direction, plural battery cells including electrode bodies having various configurations housed in containers (particularly, battery cells including electrode bodies of the winding type or stacking type housed in containers while sheets configuring the electrode bodies are laminated in the stacking direction of the battery cells).

The type of the battery cells assembled into the assembled battery is not limited to the aforementioned lithium ion secondary batteries, and batteries containing various contents with different electrode body materials and electrolytes may be used, such as lithium ion secondary batteries having negative electrodes of a lithium metal or a lithium alloy, nickel-hydrogen batteries, nickel cadmium batteries, electric double layer capacitors, and the like. The assembled battery 10 as shown in FIG. 1 is intentionally illustrated in a simple configuration, but it is apparent to a person of ordinary skills in the art that various modification and addition of facility may be made as far as the configuration and effect of the present invention are not damaged. For example, in the case of mounting the assembled battery in a vehicle such as an automobile, there may be provided an outer cover for protecting main components (battery cell groups, etc.,) of the assembled battery, parts for fixing the assembled battery to a predetermined portion of the vehicle, and parts for mutually coupling the plural assembled batteries (battery modules); but presence or absence of provision of these components are not responsible for the technical scope of the present invention.

What is claimed is:

1. A producing method of an assembled battery comprising:
producing a plurality of electrode bodies, and dividing the electrode bodies into independent lots according to an order in which electrode bodies were produced;
estimating a thickness, in an arrangement direction, of electrode bodies in each independent lot by measuring a thickness of an electrode body in each independent lot;
preparing plural battery cells, each of which includes an electrode body, from the plurality of electrode bodies, having a positive electrode and a negative electrode, and a container for housing the electrode body;
classifying each battery cell of the plural battery cells into one of plural thickness ranks based on the estimated thickness of the electrode body disposed in each battery cell;
arranging at least two battery cells of the plural battery cells, selected from a first thickness rank and a second thickness rank, in the arrangement direction, and
fastening the at least two battery cells of the plural battery cells such that a load is applied to the at least two battery cells in the arrangement direction, the at least two battery cells being selected from the plural thickness ranks such that a length in the arrangement direction of the at least two battery cells is adapted to a predetermined length when the at least two battery cells are arranged in the arrangement direction.

2. The producing method of an assembled battery according to claim 1 wherein
each electrode body is a wound electrode body in a flat shape formed by winding a positive electrode sheet including a positive electrode active substance layer on a long positive electrode current collector, and a negative electrode sheet including a negative electrode active substance layer on a long negative electrode current collector.

3. The producing method of an assembled battery according to claim 2 wherein
the wound electrode body is formed in such a manner that a positive electrode sheet base member and a negative electrode sheet base member are overlaid with each other, wound, and cut per predetermined length, the positive electrode sheet base member formed by continuously forming the positive electrode active substance layer having a length equivalent to a length of the plural battery cells on the positive electrode current collector in a longitudinal direction, the negative electrode sheet base member formed by continuously forming the negative electrode active substance layer having a length equivalent to a length of the plural battery cells on the negative electrode current collector in the longitudinal direction.

4. The producing method of an assembled battery according to claim 1 wherein the number of battery cells that are arranged is 30 or more.

5. The producing method of an assembled battery according to claim 1 wherein the number of battery cells that are arranged is 50 or more.

6. A producing method of an assembled battery comprising:
producing a plurality of electrode bodies, and dividing the electrode bodies into independent lots according to an order in which electrode bodies were produced;
estimating a thickness, in an arrangement direction, of electrode bodies in each independent lot by measuring a thickness of an electrode body in each independent lot;

preparing plural battery cells, each of which includes an electrode body, from the plurality of electrode bodies, having a positive electrode and a negative electrode, and a container for housing the electrode body;

classifying each battery cell of the plural battery cells into one of plural thickness ranks based on the estimated thickness of the electrode body disposed in each battery cell;

arranging at least two battery cells of the plural battery cells, selected from a first thickness rank and a second thickness rank, in the arrangement direction, and fastening the at least two battery cells by applying opposing forces to the at least two battery cells at opposite ends of the assembled battery in the arrangement direction, the at least two battery cells being selected from the plural thickness ranks such that a length in the arrangement direction of the at least two battery cells is adapted to a predetermined length when the at least two battery cells are arranged in the arrangement direction.

* * * * *